United States Patent [19]

Duggal et al.

[11] Patent Number: 5,889,590
[45] Date of Patent: Mar. 30, 1999

[54] OPTICAL CAVITY SENSOR

[75] Inventors: Anil Raj Duggal, Niskayuna, N.Y.;
John Frederick Ackerman, Cheyenne, Wyo.; Lionel Monty Levinson, Niskayuna, N.Y.

[73] Assignee: General Electric Company, Schenectady, N.Y.

[21] Appl. No.: 825,450

[22] Filed: Mar. 28, 1997

[51] Int. Cl.[6] .................................................... G01B 9/08
[52] U.S. Cl. ........................................ 356/352; 356/345
[58] Field of Search .................................. 356/352, 345; 428/304.4

[56] References Cited

U.S. PATENT DOCUMENTS

| 4,682,500 | 7/1987 | Uda | 356/352 |
| 5,358,776 | 10/1994 | Hotaling | 359/584 |

OTHER PUBLICATIONS

L.W. Hrubesh et al., Dielectric Properties and Electronic Applications of Aerogels, Sol–Gel Processing and Applications, Edited by Y.A. Attia, Plenum Press, New York, pp. 363–367, Jan. 1994.

George W. Scherer et al., Compression of Aerogels, Journal of Non–Crystalline Solids 186 316–320, Jan. 1995.

L.W. Hrubesh et al, Thin Aerogel Films for Optical, Thermal, Acoustic and Electronic Applications, Journal of Non–Crystalline Solids 188 46–53, Jan. 1995.

M.F. Miller et al., A Micromachined Sensor Array for Optical Measurements of Surface Pressure, 35th Aerospace Sciences Meeting & Exhibit, Jan. 6–10, 1997, Reno, NV, pp. 1–9.

*Primary Examiner*—Robert Kim
*Assistant Examiner*—Tu T. Nguyen
*Attorney, Agent, or Firm*—Ernest G. Cusick; Noreen C. Johnson

[57] ABSTRACT

A sensor for sensing conditions on an object. The sensor comprises a first at least partially reflective surface layer disposed adjacent the object in close conforming relationship with a surface of the object, an intermediate layer, and a second at least partially reflective surface layer. The intermediate layer is disposed between the first at least partially reflective surface layer and the second at least partially reflective surface layer. The intermediate layer can be formed as a solid element, a combination of solid areas and spaces, and as an aerogel.

88 Claims, 5 Drawing Sheets

OPTICAL CAVITY SENSOR

BACKGROUND OF THE INVENTION

1. Field of the Invention

The invention is directed to a method and apparatus for sensing conditions on an object. In particular, the invention is directed to a method and apparatus for determining at least one of pressure and temperature conditions on an object.

2. Description of the Art

It is desirable and useful to measure various characteristics, such as temperature and pressure on objects under operating conditions, to provide data for optimizing design details. The objects include operating rotating machinery comprising elements such as turbine parts including fans, compressor blades, turbine blades, vanes, etc. in jet engines, It is relatively difficult to measure either pressure and temperature conditions on complex and intricately shaped objects, such as in rotating turbine parts under operating conditions. Most sensors have a bulk and disturb the aerodynamic flow that, of course, causes the pressure, and adversely impacts temperature on the object. Measuring stationary conditions on an object does not provide acceptable data to optimize designs when the machinery is operating.

It has been suggested that a sensor, such as a pressure sensor, be attached to or near the rotating parts. However, a pressure sensor has a definite volume and bulk, and the positioning of such a sensor will disturb flow during operating conditions and not reflect exact pressure data on the object. If the pressure and flow are disturbed, and an exact pressure data is not obtainable, a resultant design of the rotating parts will not take into account the true pressure on the rotating parts.

One method, which has been proposed to measure pressure conditions on complex-shaped parts without disturbing aerodynamic flow, uses a "pressure-sensitive paint". The pressure-sensitive paint is essentially a luminescent material, whose luminescent properties are affected by pressure. A known organic material that is used for the pressure-sensitive paint is pyrene, which is an organic compound whose luminescent lifetime is sensitive to the presence of oxygen in its local environment.

The pressure-sensitive paint is coated onto an object and optically interrogated with a light beam, typically by directing a short-pulsed laser beam at the pyrene containing organic material. A time-dependence of luminescence from the pyrene containing organic material is monitored, for example using a photodetector. As atmospheric pressure on the object increases, partial pressure of any present oxygen increases. Thus, more oxygen diffuses into the local environment of the pyrene containing organic material.

An increased concentration of oxygen in the pyrene containing organic material leads to a decrease in the luminescent lifetime of the pyrene. As pressure increases, the luminescent lifetime of the pyrene decreases. This relationship allows a determination of pressure by monitoring the luminescent lifetime of the pyrene containing organic coating material.

However, the use of the pyrene containing organic coating material is limited to low temperature environments, since degradation of the organic "paint" containing pyrene occurs at temperatures above about 300° C. Additionally, a response time for this method is limited, both by the luminescent lifetime and a speed at which oxygen diffuses into the coating. Therefore, the use of the pyrene containing organic coating material is not effective for determining pressures conditions on rotating parts for turbines, where temperatures are routinely above about 300° C., and further where a relatively rapid response time is needed because of changes in pressure over time.

Another attempt to determine pressure conditions on an object attempts to use a micromachined sensor array, which measures by optical analysis surface pressures. However, the array discussed in *A Micromachnined Sensor Array for Optical Measurements of Surface Pressure*, Miller et al., American Institute of Aeronautics and Astronautics (Jan. 1997) is separately constructed and then attached to the object. Thus, there will be irregularities in the surface due to the numerous arrays that are attached, for example by gluing, to the object. These irregularities do not reflect the true pressure on the object. Further, the arrays are sealed by its upper surface in a drum-like fashion, and thus in reality, depend on deflection of its upper surface to determine pressure acting on the array. The performance of this array is limited by the physical characteristics of the upper surface.

Accordingly, it is relatively difficult to accurately measure pressure on complex and intricately shaped objects, such in rotating turbine parts, including blades and disks. Presently, there are no acceptable and satisfactory methods for measuring pressure data under operating conditions, which does not disturb the aerodynamic flow.

SUMMARY OF THE INVENTION

Accordingly, it is desirable to provide a method and apparatus for determining various conditions on objects that overcomes the above noted, and other, disadvantages.

Therefore, it is desirable to provide a device for sensing conditions on an object, where the device comprises a first at least partially reflective surface layer disposed adjacent the object in close conforming relationship with a surface of the object; an intermediate layer; and a second at least partially reflective surface layer. The intermediate layer being disposed between the first at least partially reflective surface layer and the second at least partially reflective surface layer.

Therefore, it is desirable to provide a system for sensing conditions on an object, where the system includes a device, which comprises a first at least partially reflective surface layer disposed adjacent the object in close conforming relationship with a surface of the object; an intermediate layer; and a second at least partially reflective surface layer. The intermediate layer being disposed between the first at least partially reflective surface layer and the second at least partially reflective surface layer.

It is further desirable to provide a method for sensing conditions on an object and a method for forming a device for sensing conditions on an object.

DETAILED DESCRIPTION OF THE EMBODIMENTS

Figure 1:
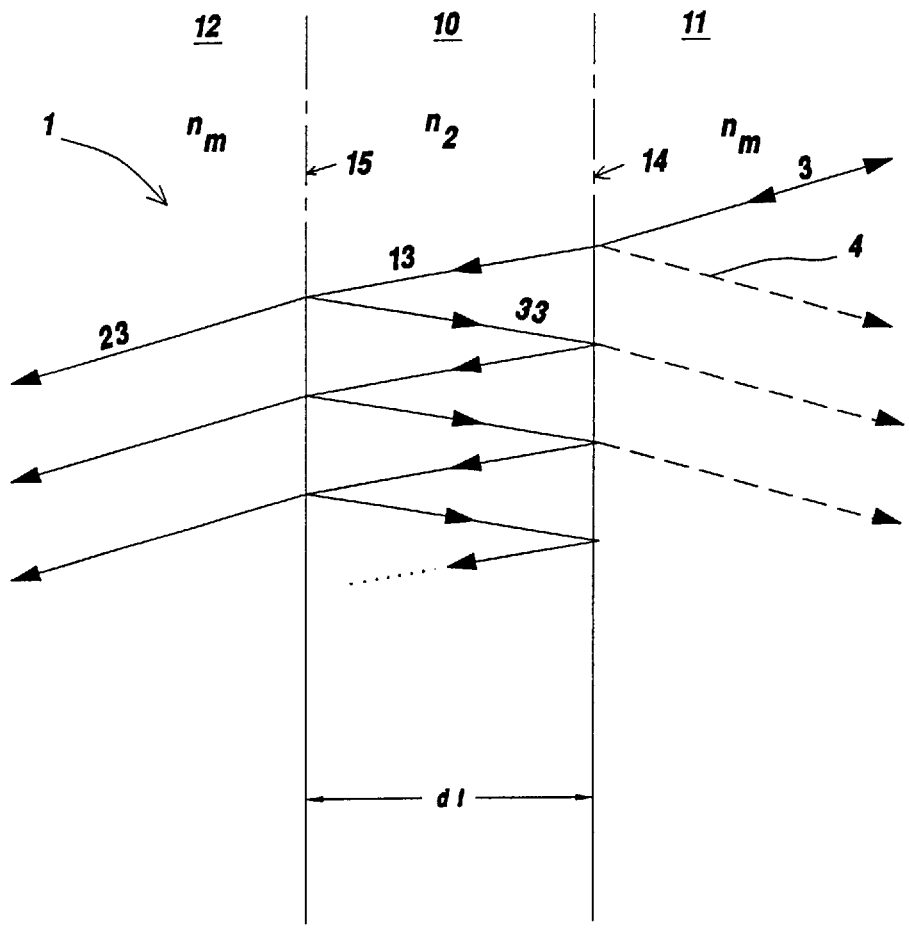
FIG. 1 is a side cross-sectional illustration of a Fabry-Perot optical cavity or dual mirror optical cavity.

It is desirable to measure various conditions, such as temperature and pressure conditions, on objects under operating conditions. The measurement of these, and other such data conditions, under operating conditions provides data useful for optimizing design details of rotating machinery, since stationary data conditions are of little use to represent and optimize operating conditions. The operating rotating machinery, as discussed hereinafter, comprises machinery such as, but not limited to, turbine parts including fans, compressor blades, turbine blades, vanes; wafers, and other substrates, all of which may be generally planar or comprises intricately curved surfaces.

In order to determine conditions, such as pressure and temperature conditions on a complex and intricately designed object without interfering with air flow or presenting other obstacles to a clear unimpeded measurement, as embodied in the invention, a Fabry-Perot optical cavity or dual mirror optical cavity is disposed on close proximity with an object. Preferably, the Fabry-Perot optical cavity or dual mirror optical cavity is coated on the object so as to provide as complete and uniform coverage of the object. Reflectance from the Fabry-Perot optical cavity or dual mirror optical cavity coating is then optically monitored. A determination as to conditions, such as pressure and temperature conditions, is then made as a result of the obtained reflectance.

In general, a Fabry-Perot optical cavity or dual mirror optical cavity, which is known in the art, comprises at least two mirrors, which are separated from each other by a certain distance. (For ease of understanding the a Fabry-Perot optical cavity or dual mirror optical cavity will be referred to as a Fabry-Perot optical cavity to facilitate the description, however this is in no way should be construed as limiting the invention.) When light is incident upon the Fabry-Perot optical cavity, optical interference occurs. As a result of the optical interference, at certain optical resonance frequencies corresponding to interference fringes, almost about 100% of the light is transmitted through the Fabry-Perot optical cavity, and none of the light is reflected. Conversely, at other frequencies, almost about 100% of the light is reflected by the Fabry-Perot optical cavity, and none of the light is transmitted through the Fabry-Perot optical cavity. Positions of the optical resonance frequencies are sensitive to, and depend on, an optical path length between the mirrors in the Fabry-Perot optical cavity. Further, the optical path between the mirrors depends on pressure on the Fabry-Perot optical cavity. Therefore, by evaluating interferences, a pressure condition can be readily determined.

Pressure conditions on the object are determined by a remote optical interrogation of the light. As described hereinafter, using light reflected from the mirrors in Fabry-Perot optical cavity coating, various conditions on the object, such as temperature and pressure conditions, can be determined.

Fabry-Perot optical cavity coatings, as embodied in the invention, comprise inorganic materials. The inorganic materials are selected to withstand high ambient temperatures, such as at operating temperatures of rotating turbine components. Accordingly, Fabry-Perot optical cavity coating, as embodied in the invention, is suitable for use at high temperatures, such as the operating temperatures of machinery, including but not limited to rotating turbine components.

Fabry-Perot optical cavity, otherwise known in the art as a Fabry-Perot Etalon, is well known in the art, and a brief description will now be provided, with reference to FIG. 1. Fabry-Perot optical cavity 1, as illustrated in FIG. 1, comprises at least two mirrors 11 and 12. The at least two mirrors 11 and 12 are at least partially reflective. In the Fabry-Perot optical cavity 1, the at least two mirrors 11 and 12 are separated from each other by a space 10 having a distance d1. Space 10 between the at least two mirrors 11 and 12 defines a refractive index $n_s$, which is different from the refractive index $n_m$ of the at least two mirrors 11 and 12.

When a light ray, also known as a light wave, 3 is incident upon the Fabry-Perot optical cavity 1, reflection and transmission of the light wave 3 occurs at a first interface 14, which is defined at the first mirror 11 and space 10. A component of the light wave 3 is reflected away from the Fabry-Perot optical cavity 1, and assuming normal reflection conditions, does not further interact with the Fabry-Perot optical cavity 1. A transmitted light wave component 13 from the light wave 3, passes through the space 10, until it strikes the second interface 15 at the mirror 12. A reflected component 33 of the transmitted light wave 13 is then reflected by the interface 15. A transmitted component 23 of the transmitted light wave 13 is transmitted through the mirror 12, and assuming normal reflection conditions, does not further interact with the Fabry-Perot optical cavity 1.

The reflected component 33 of the transmitted light wave 13 remains in the space 10 between the at least two mirrors 11 and 12, and is directed back towards the interface 14. The reflected component 33 of the transmitted light wave 13 is again reflected and transmitted at the interface 14, as discussed above with reference to the interface 15. The reflection and transmission of light wave components will continue, as discussed above and illustrated in FIG. 1, with a component of the reflected light wave component being transmitted and a component of the reflected light wave being again reflected.

Optical interference in Fabry-Perot optical cavity occurs as a result of the continued reflection and transmission of light waves. The overall reflectivity (R) from Fabry-Perot optical cavity depends, in a simplest case, on the reflectivity (r) of each mirror, the distance (d) between the mirrors, the index of refraction (n) of a medium between the mirrors, and an angle of incidence (θ) of a light wave from an energy source. Accordingly, the overall reflectivity (R) from Fabry-Perot optical cavity is determined by Equation (1):

$$R = \frac{1}{1 + \left(\frac{\pi}{2F}\right)^2 \left(\sin\left(\frac{\pi v}{v_{ax}}\right)\right)^{-2}} \quad (1)$$

where, $v$ is a frequency, F is a finesse of Fabry-Perot optical cavity (to be described hereinafter), and $v_{ax}$ is a spacing between interference peaks $v_{ax}$.

The finesse F is, in the simplest case of Fabry-Perot optical cavity comprising two mirrors having the same reflectivity, a measure of the Fabry-Perot optical cavity's overall reflectivity characteristics. The finesse F is determined according to Equation (2) in terms of mirror reflectivity (r):

$$F = \frac{\pi \sqrt{r}}{1-r} \quad (2)$$

Interference of the light waves occurs as a result of combined reflection and transmission of the light waves. A spacing between interference peaks $v_{ax}$ of the light waves results from continued reflection of a light wave in the Fabry-Perot optical cavity. The spacing $v_{ax}$ between interference peaks of the light waves in the Fabry-Perot optical cavity can be written in terms of the speed of light c. The spacing $v_{ax}$ of the interference peaks is determined, in accordance with Equation (3):

$$v_{ax} = \frac{c}{2nd \cos\theta} \quad (3)$$

Figure 2:
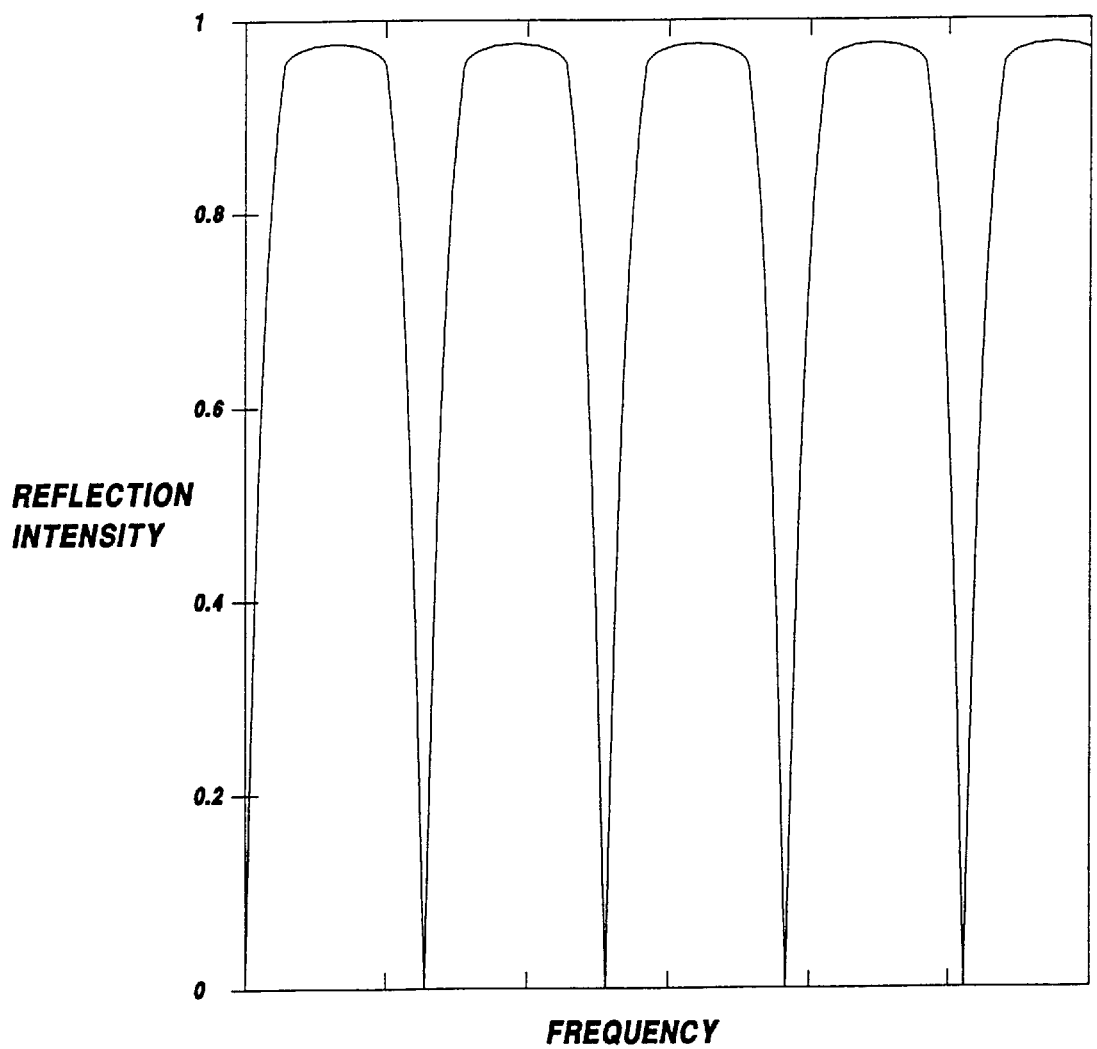
FIG. 2 is a schematic graph of reflectance versus frequency for a Fabry-Perot optical cavity or dual mirror optical cavity.

A typical reflection intensity, or reflectivity, versus frequency profile for Fabry-Perot optical cavity, determined from Equations (1)–(3), is plotted in FIG. 2. In FIG. 2, there are a series of reflectivity minima, which are spaced apart by spacing $v_{ax}$ between interference peaks. A position of each minimum $v_m$ is directly related to a spacing $v_{ax}$ between interference peaks, and can be determined from Equation (4):

$$v_m = m v_{ax} \quad (4)$$

where m is an integer.

A frequency width $v_c$ of a minima peaks in FIG. 2 is expressed in terms of the finesse F and the spacing $v_{ax}$. The frequency width $v_c$ of a minima peaks is approximately given by Equation (5):

$$v_c = \frac{v_{ax}}{F} \quad (5)$$

As can be seen from Equations (3) and (4), the position of each minima is dependent on an index of refraction (n) and distance (d) between the mirrors in the Fabry-Perot optical cavity. Accordingly, it follows that a change in position of each minima is related to a change in optical length parameters. This change in position of each minima $\Delta v_m$ is thus determined in accordance with Equation (6):

$$\Delta v_m = v_m \left( \frac{\Delta d}{d} + \frac{\Delta n}{n} \right) \quad (6)$$

A change in reflectance minima frequencies $\Delta v_m$, for example, due to changes in pressure $\Delta P$, is then determined by Equation (7):

$$\Delta v_m = v_m \left( \frac{1}{d} \frac{\partial d}{\partial P} + \frac{1}{n} \frac{\partial n}{\partial P} \right) \Delta P \quad (7)$$

where, relative magnitudes of the terms depends on particulars of the Fabry-Perot optical cavity configuration.

To determine conditions on an object under operating conditions, the Fabry-Perot optical cavity, as embodied by the invention, is applied to the object, as Fabry-Perot optical cavity coating. The Fabry-Perot optical cavity coating is applied as a relatively thin layer on surfaces of an object so as to closely adhere to the object. This positioning presents Fabry-Perot optical cavity coating with a surface substantially similar to and conforming closely with the surface of the object. By using Fabry-Perot optical cavity coating to determine at least one of temperature and pressure, the Fabry-Perot optical cavity coating does not interfere with aerodynamic flow over the object.

Examples of Fabry-Perot cavity coating configurations, in accordance with the invention, are illustrated in the figures. These examples of Fabry-Perot cavity coating configurations are merely exemplary, and are not meant to limit the invention in any way. A Fabry-Perot cavity coating configuration, as embodied in the invention, can be made by any appropriate manufacturing technique, including but not limited to, microlithographic techniques and chemical vapor deposition.

Figure 3:
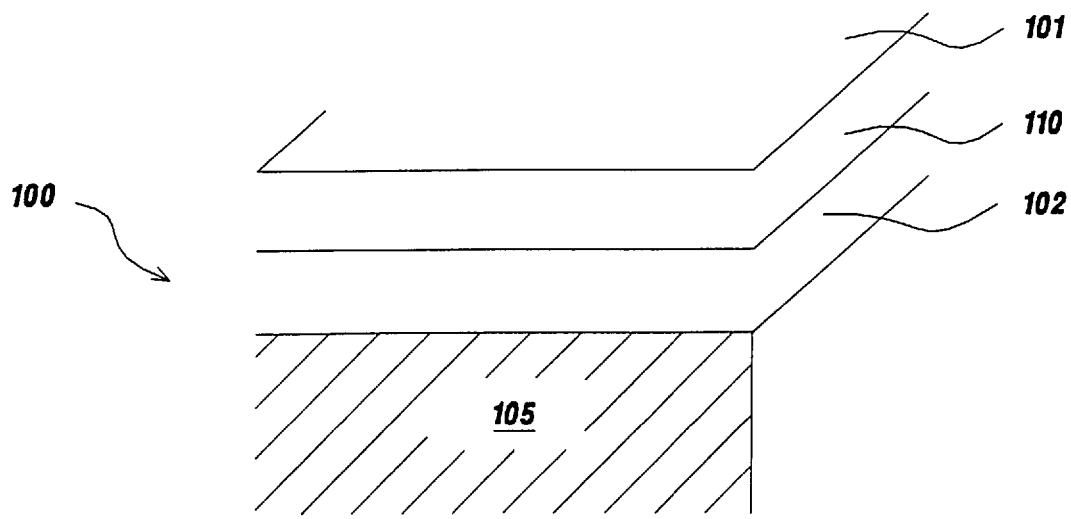
FIG. 3 is a side cross-sectional illustration of a Fabry-Perot optical cavity or dual mirror optical cavity according to one embodiment of the invention.

A Fabry-Perot optical cavity coating 100, as embodied in a first embodiment of the invention, is illustrated in FIG. 3. The Fabry-Perot optical cavity coating 100 comprises reflective surface layers or reflective surfaces 101 and 102. The reflective surfaces 101 and 102 reflect energy. The reflective surfaces 101 and 102 are formed from any appropriate reflective material. Preferably, the reflective surfaces 101 and 102 are mirror-like surfaces, and formed from an appropriate material, such as but not limited to transparent materials, including transparent dielectric reflective material and transparent semiconductor reflective material. One of the reflective surfaces 101 and 102 is positioned adjacent to an object 105, for which the data conditions during operation are desired to be obtained in a close conforming relationship with a surface of the object. In essence, a Fabry-Perot optical cavity coating, as embodied in the invention, comprises at least two different materials, one of which are the reflective surfaces and the other of which is normally positioned between the reflective surfaces.

The reflective surfaces 101 and 102 are positioned on each side of a relatively thick dielectric material layer 110, for example but not limited to, a silica layer 110. The resultant solid Fabry-Perot optical cavity coating, alternatively known as a solid Fabry-Perot Etalon, provides an indication of various conditions on the object as described hereinafter.

Figure 4:
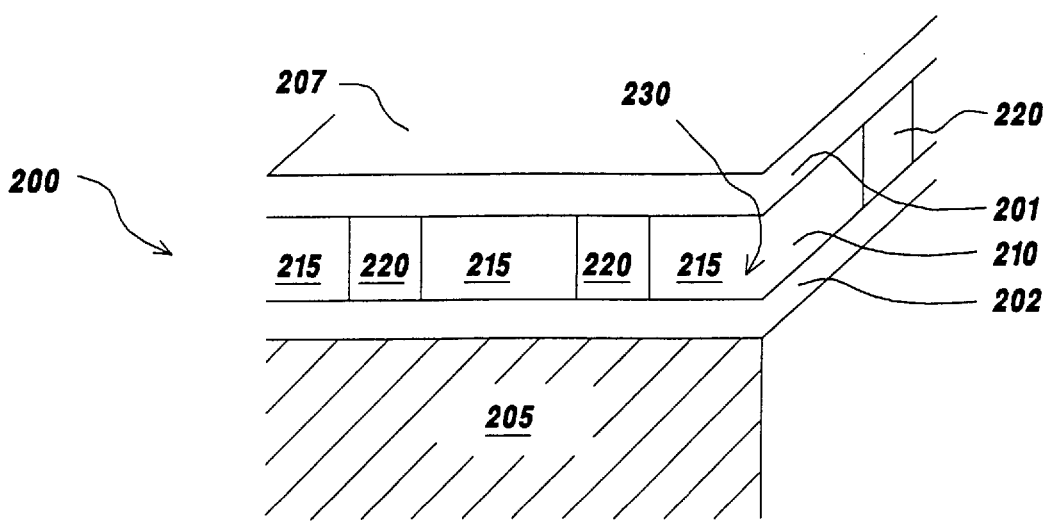
FIG. 4 is a side cross-sectional illustration of a Fabry-Perot optical cavity or dual mirror optical cavity according to another embodiment of the invention.

A Fabry-Perot optical cavity coating, as embodied in the invention, can be also formed as an air Fabry-Perot optical cavity coating, as illustrated in FIG. 4. The air Fabry-Perot optical cavity coating 200 in FIG. 4 has alternating voids or air spaces 215 and projected areas 220 between the dielectric reflective surfaces 201 and 202.

The air Fabry-Perot optical cavity coating 200 in FIG. 4, comprises reflective surfaces 201 and 202, which are substantially similar to the reflective surfaces 101 and 102 in FIG. 3. Accordingly, a detailed description will be omitted. The air Fabry-Perot optical cavity coating 200 further comprises air spaces 215. The air spaces 215 are formed by an appropriate process, such as but not limited to, plasma etching via a pattern through the reflective surface 201.

The air spaces are interconnected to form a chamber 230. The chamber 230 is connected to the atmosphere adjacent the surface 207 on the reflective surface 201 by through passages. Accordingly, the pressure acting on the surface 207 of the reflective surface 201 is substantially equal to the pressure in the chamber 230. The through passageways comprise at least one of through holes 231 (FIG. 5) in the reflective surface 201, passage ways 232 (FIG. 5) at the periphery of the Fabry-Perot optical cavity coating 200, and combinations of through holes 231 in the reflective surface 201 and passage ways 232 at the periphery of the Fabry-Perot optical cavity coating 200. The through passageways permit an equalization of pressure of the air spaces 215 and the pressure on the surface 207.

A description of one example for a formation process for the air Fabry-Perot optical cavity coating 200 will now be provided. This example is not meant to limit the invention in any way. An air Fabry-Perot optical cavity coating 200 is initially formed in a manner similar to the solid Fabry-Perot optical cavity coating 100, as described above. To convert a solid Fabry-Perot optical cavity coating 100 to an air Fabry-Perot optical cavity coating 200, air spaces or gaps 215 are formed in the dielectric material layer 210, for example by an appropriate process, such as etching using a buffered HF solution. The etching results in at least one projected area 220 of remaining dielectric material layer 210.

The periphery of the air Fabry-Perot optical cavity coating 200 is not subject to processing so that after etching, a through passageway 232 exists where air can enter to equalize pressure. Alternatively, further processing can be done to form through holes 231 in the surface 207 of the reflective surface 201, to permit equalization of pressure. The through holes 231 may be formed in any appropriate manner known in the art, including but not limited to, machining, etching, chemically dissolving the reflective surface 210 at selected areas, and combinations of known manners.

The air Fabry-Perot optical cavity coating 200, as embodied in FIG. 4, illustrates a plurality of air gaps 215 and projected areas 220. However, the number of air gaps 215 and projected areas 220, and thus the size of the chamber 230, is dependent on the intended use of the Fabry-Perot optical cavity coating 200, and the design characteristics of the object 205. The projected areas 220 of remaining dielectric material layer 210 provide mechanical strength to the Fabry-Perot optical cavity.

Figure 5:
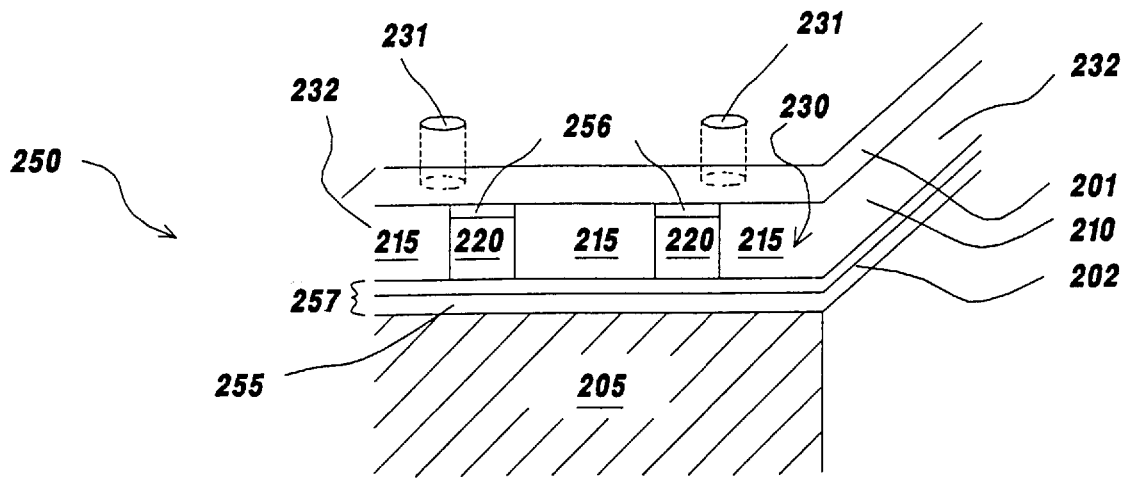
FIG. 5 is a side cross-sectional illustration of a Fabry-Perot optical cavity or dual mirror optical cavity according to a third embodiment of the invention.

A further embodiment of Fabry-Perot optical cavity, for use as Fabry-Perot optical cavity coating, as embodied in the invention, is illustrated in FIG. 5. In FIG. 5, like characters are identified by similar reference characters, as used in previous figures. For ease of discussion, only the features of this embodiment that differ from the previous figures will be discussed.

The Fabry-Perot optical cavity coating 250, as embodied in the invention and illustrated in FIG. 5, comprises at least one optical absorber to prevent erroneous reflection components from effecting the condition determination, as described hereinafter that may adversely effect the obtaining of data on an object and thus, adversely effect the determination of conditions on the object. As illustrated in FIG. 5, at least one optical absorber 255 is positioned on the object 205, so that the optical absorber 255 is sandwiched between the object 205 and the reflective surface 202, to form a reflective surface layer 257. Therefore, if light is transmitted through the reflective surfaces 201 and 202, it will not be reflected by the object 205, so that it will not adversely effect the obtaining of data on an object and thus, adversely effect the determination of conditions on the object.

Further, as illustrated in FIG. 5, the Fabry-Perot optical cavity coating 250 comprises another optical absorber 256. The optical absorber 256 is positioned on a projected area 220, so as to be between a projected area 220 and the reflective surface 201. The optical absorber 256 reduces any effect of reflected light from a projected area 220 will have on the determination of conditions. Thus, the optical absorber 256 will prevent any adverse effect of erroneous light reflection on the obtaining of data on an object and thus, any adverse effect the determination of conditions on the object.

FIG. 5 illustrates the Fabry-Perot optical cavity coating 250 comprising two absorbers 255 and 256. However, the scope of the invention comprises the Fabry-Perot optical cavity coating 250 including at least one of the illustrated absorbers 255 and 256. It is not necessary that both absorbers 255 and 256 be used together, however the use of both absorbers 255 and 256 in the Fabry-Perot optical cavity coating 250 will provide enhanced signal to noise ratio.

Figure 6:
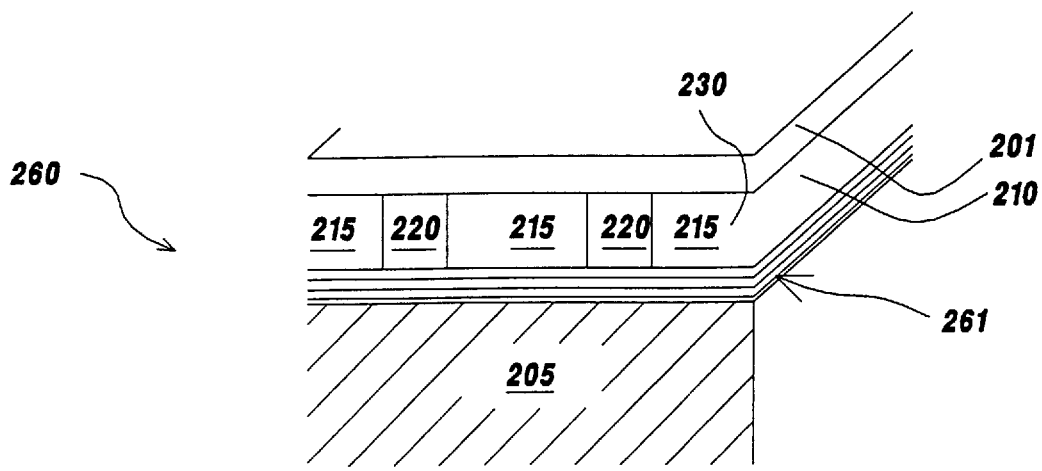
FIG. 6 is a side cross-sectional illustration of a Fabry-Perot optical cavity or dual mirror optical cavity according to fourth embodiment of the invention.

A further embodiment of Fabry-Perot optical cavity coating, as embodied in the invention is illustrated in FIG. 6. For ease of discussion, like characters are identified by similar reference characters, as used in previous figures. Also, only the features of this embodiment that differ from the previous figures will be discussed.

In the Fabry-Perot optical cavity coating 260, as embodied in the invention and illustrated in FIG. 6, at least one of the reflective surfaces comprise a multilayer dielectric reflective surface layer 261. While the reflective surface closest to the object 205 is illustrated in FIG. 6 as the multilayer dielectric reflective surface, the scope of the Fabry-Perot optical cavity coating, as embodied in the invention, also includes either reflective surface 201 and 261 comprising a multilayer dielectric reflective surface 261.

Figure 7:
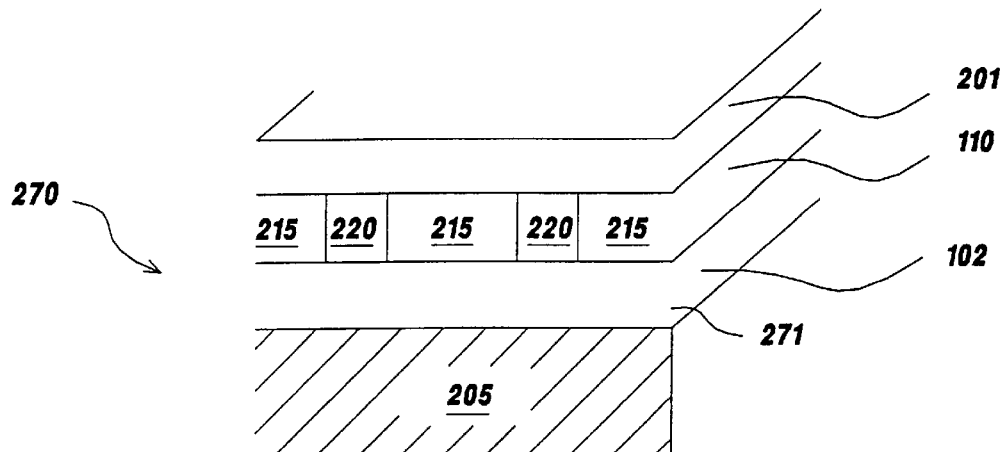
FIG. 7 is a side cross-sectional illustration of a Fabry-Perot optical cavity or dual mirror optical cavity according to a fifth embodiment of the invention.

A further embodiment of Fabry-Perot optical cavity coating is illustrated in FIG. 7. For ease of discussion, like characters are identified by similar reference characters, as used in previous figures. Also, only the features of this embodiment that differ from the previous figures will be discussed.

In the Fabry-Perot optical cavity coating 270, as embodied and illustrated in FIG. 7, at least one of the reflective surfaces comprises a thin partly reflective metallic layer 271. The thin partly reflective metallic layer 271 is formed from any appropriate metal, which can be formed into a thin layer and exhibits partial reflectivity. For example, the thin partly reflective metallic layer 271 comprises at least one of the group consisting of platinum, silver, gold and other known standard mirror materials for the thin partly reflective metallic layer 271. While the reflective surface closest to the object 205 is illustrated in FIG. 6 as the thin partly reflective metallic layer 271, the scope of the invention includes either or both reflective surfaces in the Fabry-Perot optical cavity coating 270 comprising a thin partly reflective metallic layer. The thin partly reflective metallic layer 271 provides enhanced dielectric performance and increased stability of the Fabry-Perot optical cavity coating 270.

The use of Fabry-Perot optical cavity coating, as embodied in the invention, in a system to determine conditions, such as pressure and temperature conditions, will now be described, with reference to FIG. 8. Fabry-Perot optical cavity coating 180, as embodied in the invention, is disposed, for example by a coating process, on an object 181, such as a rotating turbine component. A light source 182, for example a broadband light source, is activated, and a light wave 184 is generated. The light wave 184, for example at least one of a broadband or narrow band wave, is directed onto the Fabry-Perot optical cavity coating 180, which is on the object 181. The light wave 184 strikes the Fabry-Perot optical cavity coating 180, where some of the light is either transmitted through the Fabry-Perot optical cavity coating 180 and a reflected component 185 of the light reflected away from the Fabry-Perot optical cavity coating 180.

A monitor 183, otherwise known as a light receiver, that one of a spectrometer or phase sensitive discriminator or similar device, receives the light 185 that is reflected from the Fabry-Perot cavity coating 180. The monitor then transmits data to a processor 188, where a change in a frequency minima position from the reflected component light wave 185 is determined from the data provided by the monitor 183.

The processor 188 interrogates the light's reflected intensity versus the frequency of the light source 182, and frequency versus reflected intensity is plotted, as a monitored spectrum, similar to that illustrated in FIG. 2. The monitor 188 can also determine a change in position of interference peaks and other spectra points, and then use the changes to determine condition changes, as is known in the art.

As discussed above with respect to FIG. 2, changes in conditions, such as pressure conditions, are characterized as shifts in minima position in a monitored spectrum. Accordingly, a determination of at least one of a change in temperature and pressure conditions is possible from an analysis of monitored spectrum shifts in minima positions. For example, the monitor 188 can use any known methods to interrogate the reflected light, such as frequency resolving the spectra positions, slope detection and other similar analytical processes, as known in the art.

Figure 8:
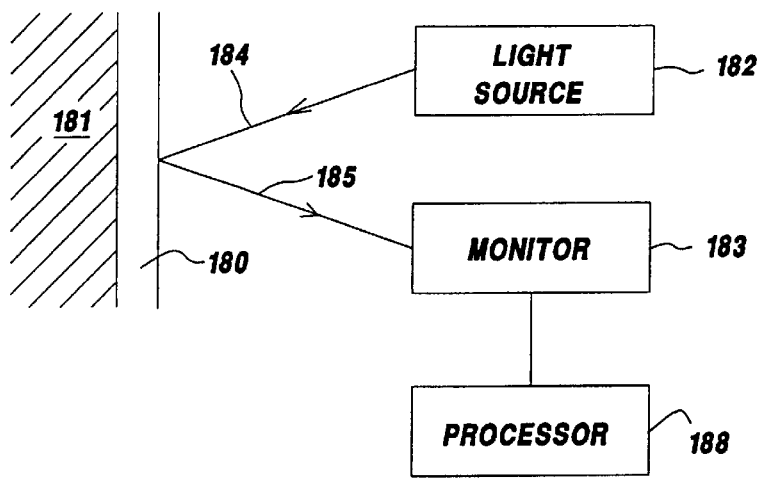
FIG. 8 is a side cross-sectional illustration of operation of a Fabry-Perot optical cavity or dual mirror optical cavity, as embodied in the invention.

In FIG. 8, when the Fabry-Perot optical cavity coating 180 uses a light source comprising a broadband light source 182 having a frequency line width $\Delta v_{source}$, such that the wideband source 182 exhibits $\Delta v_{source} > v_{ax}$. Thus, at least one minimum of the broadband light will fall within a source optical line width. Accordingly, any appropriate broadband energy source, for example but not limited to, one of an arc lamp and a wideband laser, is usable with the Fabry-Perot optical cavity coating 180 to determine pressure and temperature changes on an object.

A suitable monitor 183, alternately known as an optical resolving mechanism, comprises but is not limited to a grating monochromator with a CCD. Such a mechanism is needed to resolve reflected light for a usable real time analysis. For example, a grating monochromator with a CCD spectrally resolves reflected light within a time period in a real-time range, for example in a range between about 10 microseconds to about 1000 microseconds for a usable real time analysis. Alternatively, a similar optical resolving mechanism device, such as but not limited to, a diode array, resolves reflected light for a usable real time analysis.

Other systems are usable to monitor a change in position of the minima from light reflected from Fabry-Perot optical cavity coating. In FIG. 8, a suitable light or energy source can comprise an adjustable light source, such as an adjustable laser, which possess a frequency corresponding to about a halfway point of one of reflectance minima. The light source can take any appropriate form, as long as its frequency can correspond to about a halfway point of one of reflectance minima. Preferably, the light source is a laser, and more preferably the laser comprises a narrow band laser.

The amplitude of the light, here laser light, reflected from the Fabry-Perot cavity coating is then monitored, by an appropriate detector, such as but not limited to a photo diode. For a laser with a frequency corresponding to about a half-way point of the reflectance minima, a change in position of the minima, in response to a pressure change, results in a change in the reflectance amplitude. An absolute minimum detectable pressure is determined by a photon shot noise limit, where the photon shot noise limit depends on incident laser power and frequency bandwidth of the detector. The system as discussed above comprising a laser light and photo diode, is extremely sensitive to external factors and initializing of the system. With this system, it is necessary to maintain tuning of the light source, for example the laser, so its frequency is locked to a halfway point of one of the reflectance minima.

In known Fabry-Perot optical cavities, the space between the reflective surfaces is sometimes filled by a substance. The composition of the substance is dependent on the intended use and applications of the Fabry-Perot optical cavity. Accordingly, the substance can be a gas, a liquid, solid or material, depending on the intended use of the Fabry-Perot optical cavity.

For a pressure sensor, it has been determined that it is desirable to provide a material in between the reflective surfaces in Fabry-Perot optical cavity coating that provides a high degree of structural support and integrity, in combination with pressure sensitivity, while also withstanding the high temperature and pressure conditions of rotating machinery, such as but not limited to rotating turbine components. Also, it is desirable for the material between the reflective surfaces to be relatively insensitive to temperature variations. While a gas provides pressure sensitivity, a gas will not provide structural support and integrity. Further, a solid material will provide structural support and integrity, however, it will often be more sensitive to temperature than pressure. Therefore, it is desirable to provide a material between the reflective surfaces of Fabry-Perot optical cavity coating that provides high degree of structural support and integrity, in combination with pressure sensitivity. The Fabry-Perot optical cavity coating provides enhanced measurements of pressure fluctuations determinations using interferometery, as discussed above with regard to other embodiments embodied in the invention.

Accordingly, as embodied in the invention, it has been determined that a Fabry-Perot optical cavity coating, as embodied in the invention, provided with an aerogel film between the reflective surfaces or reflective surface layers provides the desired high degree of structural support and integrity, in combination with pressure sensitivity. An aerogel film will be relatively insensitive to temperature variations, and provide a high degree of structural support and integrity, in combination with pressure sensitivity.

Aerogels are known materials that exhibit structural integrity, yet are relatively sensitive to pressure changes. Aerogels are basically porous ceramic compositions. Known aerogel compositions comprise many different constituents, and include but are not limited to, $SiO_2$-based compositions. The individual constituents and components used often lead to very porous aerogels. For example, the individual constituents and components used in aerogels often provide the aerogel with a porosity of about 90% porosity and preferably about 99% porosity.

Figure 9:
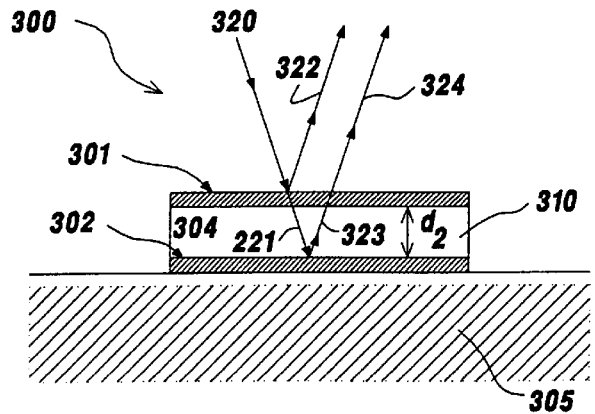
FIG. 9 is a side cross-sectional illustration of a further embodiment of a Fabry-Perot optical cavity or dual mirror optical cavity comprising an aerogel film, as embodied in the invention.

An aerogel Fabry-Perot optical cavity coating 300, as embodied in the invention and as illustrated in FIG. 9, comprises an aerogel film 310 positioned between the reflective surfaces 301 and 302 in the aerogel Fabry-Perot optical cavity coating 300. The aerogel Fabry-Perot optical cavity coating 300 comprises at least two partially reflective surfaces 301 and 302, and is positioned on an object or substrate 305, for which various data determinations are desired. The space 304 between the reflective surfaces 301 and 302 is filed with an aerogel film 310.

The space 304 between the reflective surfaces 301 and 302, which is occupied by an aerogel film 310, is defined by a distance $d_2$, where the distance $d_2$ is in a range between about 0.1 to about 100 microns. However, the exact distance $d_2$ is dependent on the intended use of the aerogel Fabry-Perot optical cavity coating 300. The exact distance $d_2$ is also dependent on spatial constraints on the object 305 and aerogel Fabry-Perot optical cavity coating 300. The aerogel Fabry-Perot optical cavity coating 300, comprising the aerogel film 310, is also sensitive to pressure, yet relatively insensitive to temperature variations, such as those resulting from operating conditions of turbine components.

An average pore size of a aerogel, as embodied in the aerogel Fabry-Perot optical cavity coating 300, is typically well below a wavelength of light wave that is to be used to optically interrogate the aerogel Fabry-Perot optical cavity coating 300. For example, an average pore size of known aerogels is about 50 nm, and the about 50 nm pore size provides for a substantially transparent aerogel material, which of course, enhances the transmission of a light wave through the aerogel film 310.

Aerogels exhibit strong structural integrity and characteristics, but, possess a compressive modulus that is relatively sensitive to pressure. The compressive modulus of an aerogel is dependent on a density of the aerogel composition. Accordingly, dependent on a density the compressive modulus of an aerogel can be relatively low. For example but not limiting the invention, an aerogel can possess a compressive modulus of about 1 MPa, or about 10 atmospheres.

In the aerogel Fabry-Perot optical cavity coating 300, as embodied in the invention and illustrated in FIG. 9, the modulus of the aerogel film 310 is in a range between about 0.1 MPa to about 1000 MPa. The exact modulus for the aerogel film 310 is dependent on an intended use of the aerogel Fabry-Perot optical cavity coating 300 and operating condition constraints presented to the aerogel Fabry-Perot optical cavity coating 300.

The aerogel film 310, in the aerogel Fabry-Perot optical cavity coating 300 and as embodied in the invention, can be made by any appropriate fabrication processes. The fabrication processes include, but are not limited to, depositing a precursor liquid onto a surface, such as a glass or oxidized metal, for example by spinning or wicking. The spun or wicked precursor liquid is then converted to an aerogel film by an appropriate drying step, for example by at least one of a super-critical drying and evaporative drying. The drying is also combinable with chemical treatments, as known in the art, to result in an acceptable and desirable aerogel composition and aerogel film with a desired modulus. Accordingly, a detailed discussion of the fabrication method for the aerogel is omitted.

After formation of an aerogel 310 in the aerogel Fabry-Perot optical cavity coating 300, the aerogel film 310 is relatively physically thermally and chemically stable under most operating conditions, such as high temperatures, that would be expected during operation of turbine components. For example, with an aerogel comprising a $SiO_2$-based aerogel composition, the aerogel film is stable to a temperature around about 600° C. This stability is highly desirable since it is insensitive to temperature variations, and provides a high degree of structural support and integrity, in combination with pressure sensitivity.

The operation of an aerogel Fabry-Perot optical cavity coating 300, as embodied by the invention and illustrated in FIG. 9, will now be discussed. An appropriate light wave 320 is directed toward the aerogel Fabry-Perot optical cavity coating 300, which is located adjacent the object 305. A reflected component 322 of the light wave 320 is reflected by the reflective surface 301. A component light wave 321 of the light wave 320 is transmitted through the reflective surface 301, and is also transmitted through the aerogel film 310. The light wave component 321 is then reflected by the reflective surface 302 and directed out of the in the aerogel Fabry-Perot optical cavity coating 300 as a transmitted and then reflected light wave component 324.

The reflected light wave component 321 and the transmitted and then reflected light wave component 324 interact and produce interference. The interference is detected by an appropriate monitor (not illustrated), similar to those discussed above. The interference can then be plotted as a spectrum, similar to that in FIG. 2.

The following description and equations apply to all Fabry-Perot optical cavity coatings, as embodied in the invention, regarding the determination of temperature and pressure changes, as a result of the above-described process.

A shift in a Fabry-Perot optical cavity coating reflectance minimum frequency $\Delta v_m$ is determined in accordance with Equations (10) and (11):

$$\Delta v_m = \left(\frac{\partial v_m}{\partial P}\right) \Delta P + \left(\frac{\partial v_m}{\partial T}\right) \Delta T \quad (10)$$

$$\Delta v_m = \quad (11)$$

$$v_m \left[\left(\frac{\partial \epsilon}{\partial P} + \frac{1}{n} \frac{\partial n}{\partial P}\right) \Delta P + \left(\frac{\partial \epsilon}{\partial T} + \frac{1}{n} \frac{\partial n}{\partial T}\right) \Delta T\right]$$

where P is pressure, $v$ is frequency, n is refractive index, T is temperature, and $\epsilon$ is strain on the Fabry-Perot optical cavity coating.

For a substantially solid silica film, it is assumed that $$\left(\frac{\partial v_m}{\partial P}\right)_{SiO_2} \cong v_m(1 \times 10^{-6}/\text{atm}) \quad (12)$$

and $$\left(\frac{\partial v_m}{\partial T}\right)_{SiO_2} \cong v_m(6 \times 10^{-6}/K) \quad (13)$$

and

Thus, with either one of an isothermal evaluation and an equal pressure evaluation, the change in pressure and temperature, respectively, can be determined for particular Fabry-Perot optical cavity coatings.

From Equations (12) and (13), a substantially solid film in the Fabry-Perot optical cavity coating, as embodied in the invention, is approximately about 6 times more sensitive to a about a 1° C. change in temperature, when compared to a 1 atm. change in pressure.

The relatively small value of $$\frac{1}{v_m} (\partial v_m/\partial P)_{SiO_2}$$

as in Equation (12) limits a measurement that is possible for small pressure changes, for example pressure changes of about 0.1 atm.

For example, and in no way limiting of the invention, with an aerogel film used as the spacer material in a certain Fabry-Perot optical cavity coating, a first partial derivative of $\partial \epsilon/\partial P = 1/\text{modulus}$ equals about 0.1/atm., since the modulus of an aerogel can be as low as 1 MPa (approximately 10 atm.) Therefore, the use of an aerogel film greatly increases pressure sensitivity of the in the Fabry-Perot optical cavity coating, with $(\partial v_m/\partial P)_{aerogel}$ equal to about $v_m(0.1/\text{atm.})$. In other words, the aerogel in a predetermined Fabry-Perot optical cavity coating is about $10^4$ times more sensitive to a 1 atm. change in pressure than to a 1 degree change in temperature. The above is specific to the particulars discussed in the example. Different Fabry-Perot optical cavity coatings with aerogel films will have different particulars that will result in different specifics, however the basic operational principle remains constant.

While the embodiments described herein are preferred, it will be appreciated from the specification that various combinations of elements, variations or improvements therein may be made by those skilled in the are that are within the scope of the invention.

What is claimed is:

1. A device for sensing conditions on an object, the device comprising:
   a first at least partially reflective surface layer disposed adjacent the object in close conforming relationship with a surface of the object;
   an intermediate layer comprising a dielectric material; and
   a second at least partially reflective surface layer, the intermediate layer being disposed between the first at least partially reflective surface layer and the second at least partially reflective surface layer, wherein an area for sensing includes the first at least partially reflective surface layer, the intermediate surface layer comprising the dielectric material, and the second at least partially reflective surface layer.

2. The device according to claim 1, wherein the dielectric material comprises a solid dielectric material.

3. The device according to claim 1, wherein the first at least partially reflective surface layer and the second at least partially reflective surface layer comprise a dielectric material.

4. The device according to claim 1, wherein the intermediate layer comprises interdisposed areas of solid material and spaces without solid material, the interdisposed areas of solid material and spaces without solid material defining a chamber between the first at least partially reflective surface layer and the second at least partially reflective surface layer.

5. The device according to claim 4, wherein the areas of solid material contact the first at least partially reflective surface layer and the second at least partially reflective surface layer.

6. The device according to claim 4, wherein the areas of solid material comprise a dielectric material.

7. The device according to claim 4, further comprising at least one through passage, the at least one through passage extending from the chamber to an exterior of the device, the at least one through passage connecting the chamber with atmosphere on the exterior of the device to equalize pressure between the chamber and exterior of the device.

8. The device according to claim 7, wherein the at least one through passage comprises at least one through hole in the first at least partially reflective surface layer.

9. The device according to claim 7, wherein the at least one through passage comprises a passageway at a periphery of the sensor.

10. A device according to claim 1, further comprising at least one optical absorber.

11. The device according to claim 10, wherein the at least one optical absorber is disposed between the first at least partially reflective surface layer and the object.

12. The device according to claim 10, wherein the at least one optical absorber is disposed between the intermediate layer and the second at least partially reflective surface layer.

13. The device according to claim 1, further comprising at least a first optical absorber disposed between the first partially reflective surface layer and the object and at least a second optical absorber disposed between the intermediate layer and the second at least partially reflective surface layer.

14. The device according to claim 1, wherein at least one of the first partially reflective surface layer and the second partially reflective surface layer comprise a multilayered partially reflective surface layer.

15. The device according to claim 1, wherein at least one of the first partially reflective surface layer and the second partially reflective surface layer comprise a thin at least partially reflective metallic layer, the thin at least partially reflective metallic layer comprises a material selected from the group consisting of:
   platinum, silver, and gold.

16. The device according to claim 1, wherein the intermediate layer comprises an aerogel.

17. The device according to claim 16, wherein the aerogel comprises an aerogel film.

18. The device according to claim 16, wherein the aerogel is relatively insensitive to temperature variations and provides a high degree of structural support and pressure sensitivity.

19. The device according to claim 17, wherein the aerogel comprises $SiO_2$.

20. The device according to claim 17, wherein the aerogel has a porosity greater than about 90%.

21. The device according to claim 1, wherein the device is coated onto the object.

22. The device according to claim 1, wherein the device is formed on the object by chemical vapor deposition.

23. The device according to claim 1, wherein the device is formed on the object by microlithograph techniques.

24. The device according to claim 1, wherein at least one of the first at least partially reflective surface layer and the second at least partially reflective surface layer comprise a semiconducting mirror.

25. A system for sensing conditions on an object, the system comprising:
   a sensor, the sensor comprising:
      a first at least partially reflective surface layer disposed adjacent the object in close conforming relationship with a surface of the object;
      an intermediate layer comprising a dielectric material; and
      a second at least partially reflective surface layer, the intermediate layer being disposed between the first at least partially reflective surface layer and the second at least partially reflective surface layer; wherein an area for sensing includes the first at least partially reflective surface layer, the intermediate surface layer comprising the dielectric material, and the second at least partially reflective surface layer;
   an energy source;
   a monitor; and
   a processor,
   wherein the energy source generates an energy wave and directs the energy wave to the sensor, at least a component of the energy wave is reflected by the first at least partially reflective surface layer and a component of the energy wave is transmitted through the first at least partially reflective surface layer and the intermediate layer comprising the dielectric material and is then reflected to the monitor, the components of the reflected energy wave received by the monitor, the monitor transmitting data representative of the components of the reflected energy wave to the processor, and the processor evaluating the components to determine conditions on the object.

26. The system according to claim 25, wherein the system is kept at a constant temperature, and the processor determines pressure change conditions.

27. The system according to claim 25, wherein the system is kept at a constant pressure, and the processor determines temperature change conditions.

28. The system according to claim 25, wherein the dielectric material comprises a solid dielectric material.

29. The system according to claim 25, wherein the first at least partially reflective surface layer and the second at least partially reflective surface layer comprise a dielectric material.

30. The system according to claim 25, wherein the intermediate layer comprises interdisposed areas of solid material and spaces without solid material, the interdisposed areas of solid material and spaces without solid material defining a chamber between the first at least partially reflective surface layer and the second at least partially reflective surface layer.

31. The system according to claim 30, wherein the areas of solid material contact the first at least partially reflective surface layer and the second at least partially reflective surface layer.

32. The system according to claim 30, wherein the areas of solid material comprise a dielectric material.

33. The system according to claim 30, further comprising at least one through passage, the at least one through passage extending from the chamber to an exterior of the sensor, the at least one through passage connecting the chamber with atmosphere on the exterior of the sensor to equalize pressure between the chamber and exterior of the sensor.

34. The system according to claim 33, wherein the at least one through passage comprises at least one through hole in the first at least partially reflective surface layer.

35. The system according to claim 33, wherein the at least one through passage comprises a passageway at a periphery of the sensor.

36. A system according to claim 25, further comprising at least one optical absorber.

37. The system according to claim 36, wherein the at least one optical absorber is disposed between the first at least partially reflective surface layer and the object.

38. The system according to claim 36, wherein the at least one optical absorber is disposed between the intermediate layer and the second at least partially reflective surface layer.

39. The system according to claim 25, further comprising at least one optical absorber disposed between the first partially reflective surface layer and the object and a second optical absorber disposed between the intermediate layer and the second at least partially reflective surface layer.

40. The system according to claim 25, wherein the at least one of the first partially reflective surface layer and the second partially reflective surface layer comprise one of a multilayered partially reflective surface layer and a thin at least partially metallic reflective layer.

41. The system according to claim 25, wherein the intermediate layer comprises an aerogel.

42. The system according to claim 41, wherein the aerogel is relatively insensitive to temperature variations and provides a high degree of structural support and pressure sensitivity.

43. The system according to claim 41, wherein the aerogel comprises $SiO_2$.

44. The system according to claim 41, wherein the aerogel has a porosity greater than about 90%.

45. The system according to claim 25, wherein the sensor is coated onto the object.

46. The system according to claim 25, wherein the sensor is formed onto the object by chemical vapor deposition.

47. The system according to claim 25, wherein the sensor is formed onto the object by microlithograph techniques.

48. The system according to claim 25, wherein at least one of the first at least partially reflective surface layer and the second at least partially reflective surface layer comprise a semiconducting mirror.

49. A method for sensing conditions on an object, the method comprising:
generating an energy wave from an energy source;
directing the energy wave toward a sensor on the object, the sensor comprising a first at least partially reflective surface layer disposed adjacent the object in close conforming relationship with a surface of the object; an intermediate layer comprising a dielectric material; and a second at least partially reflective surface layer, the intermediate layer being disposed between the first at least partially reflective surface layer and the second at least partially reflective surface layer;
reflecting at least a reflected energy component of the energy wave from the first at least partially reflective surface layer, wherein an area for sensing includes the first at least partially reflective surface layer, the intermediate surface layer comprising the dielectric material, and the second at least partially reflective surface layer;
reflecting at least a component of the energy wave that has passed through the first at least partially reflective surface layer and the intermediate layer comprising the dielectric material by the second at least partially reflective surface layer;
receiving the components of the reflected energy wave by a monitor;
transmitting data representative of the components of the reflected energy wave from the monitor to a processor; and
evaluating the component of the reflected energy to determine conditions on the object.

50. The method according to claim 49, further comprising:
evaluating the reflected light component to determine pressure change conditions on the object.

51. The method according to claim 49, further comprising:
evaluating the reflected light component to determine temperature change conditions on the object.

52. The method according to claim 49, wherein the dielectric material comprises a solid dielectric material.

53. The method according to claim 49, wherein the first at least partially reflective surface layer and the second at least partially reflective surface comprise dielectric a material.

54. The method according to claim 49, further comprising:
providing the intermediate layer comprising interdisposed areas of solid material and spaces without solid material; to define a chamber between the first at least partially reflective surface layer and the second at least partially reflective surface layer.

55. The method according to claim 54, further comprising:
positioning the areas of solid material in contact with the first at least partially reflective surface layer and the second at least partially reflective surface layer.

56. The method according to claim 54, wherein the areas of solid material comprise a dielectric material.

57. The method according to claim 54 further comprising:
equalizing pressure in the chamber with pressure at a surface of the first at least partially reflective surface layer.

58. The method according to claim 57, wherein equalizing comprises forming at least one through passage that connects the chamber with an exterior atmosphere of the sensor, wherein the at least one through passage comprises at least one through hole in the first at least partially reflective surface layer.

59. The method according to claim 57, wherein equalizing comprises forming at least one through passage that connect the chamber with an exterior atmosphere of the sensor, wherein the at least one through passage comprises a passageway at a periphery of the sensor.

60. A method according to claim 49, further comprising:
absorbing optical energy between the first at least partially reflective surface layer and the object.

61. The method according to claim 49, further comprising forming at least one of the first partially reflective surface layer and the second partially reflective surface layer from a multilayered partially reflective surface layer.

62. The method according to claim 49, further comprising forming at least one of the first partially reflective surface layer and the second partially reflective surface layer from a thin at least partially reflective metallic layer, the thin at least partially reflective metallic layer comprises a material selected from the group consisting of:
platinum, silver, and gold.

63. The method according to claim 49, further comprising providing the intermediate layer comprising an aerogel, wherein the aerogel is relatively insensitive to temperature variations and provides a high degree of structural support and pressure sensitivity.

64. The method according to claim 63, wherein the aerogel comprises $SiO_2$.

65. The method according to claim 63, wherein the aerogel has a porosity at least greater than about 90%.

66. The method according to claim 49, further comprising coating the sensor on the object.

67. The method according to claim 49, further comprising coating the sensor on the object by chemical vapor deposition.

68. The method according to claim 49, further comprising coating the sensor on the object by microlithograph techniques.

69. The method according to claim 49, further comprising at least one of the first at least partially reflective surface layer and the second at least partially reflective surface layer comprising a semiconducting mirror.

70. A method for forming a device to sense conditions on an object, the method comprising:
providing an object; and
disposing a device to sense conditions on the object in close conforming relationship with a surface of the object;
the device comprises a first at least partially reflective surface layer disposed adjacent the object; an intermediate layer comprising a dielectric material; and a second at least partially reflective surface layer, the intermediate layer being disposed between the first at least partially reflective surface layer and the second at least partially reflective surface layer, wherein an area for sensing includes the first at least partially reflective surface layer, the intermediate surface layer comprising the dielectric material, and the second at least partially reflective surface layer.

71. The method according to claim 70, wherein the disposing a device to sense conditions on the object in close conforming relationship with a surface of the object further comprises coating the device on the object.

72. The method according to claim 70, the disposing a device to sense conditions on the object in close conforming relationship with a surface of the object further comprises coating the device on the object by chemical vapor deposition.

73. The method according to claim 70, the disposing a device to sense conditions on the object in close conforming relationship with a surface of the object further comprises coating the device on the object by microlithograph techniques.

74. The method according to claim 70, wherein the dielectric material comprises a solid dielectric material.

75. The method according to claim 70, further comprising forming the first at least partially reflective surface layer and the second at least partially reflective surface from a dielectric material.

76. The method according to claim 70, further comprising:
providing the intermediate layer comprising interdisposed areas of solid material and spaces without solid material; and
forming a chamber between the first at least partially reflective surface layer and the second at least partially reflective surface layer.

77. The method according to claim 76, further comprising:
positioning the areas of solid material in contact with the first at least partially reflective surface layer and the second at least partially reflective surface layer.

78. The method according to claim 76, further comprising forming the areas of solid material from a dielectric material.

79. The method according to claim 76, further comprising:
providing a device for equalizing pressure in the chamber with pressure at a surface of the first at least partially reflective surface layer.

80. The method according to claim 79, wherein the device for equalizing pressure comprises at least one through passage that connects the chamber with an exterior atmosphere of the sensor, wherein the at least one through passage comprises at least one through hole in the first at least partially reflective surface layer.

81. The method according to claim 79, wherein the device for equalizing pressure comprises at least one through passage that connect the chamber with an exterior atmosphere of the sensor, wherein the at least one through passage comprises a passageway at a periphery of the sensor.

82. A method according to claim 70, further comprising providing at least one absorbing optical energy device between the first at least partially reflective surface layer and the object.

83. The method according to claim 70, further comprising forming the at least one of the first partially reflective surface layer and the second partially reflective surface layer from a multilayered partially reflective surface layer.

84. The method according to claim 70, further comprising forming at least one of the first partially reflective surface layer and the second partially reflective surface layer from a thin at least partially reflective metallic layer, the thin at least partially reflective metallic layer comprises a material selected from the group consisting of:
platinum, silver, and gold.

85. The method according to claim 70, further comprising providing an aerogel in the intermediate layer.

86. The method according to claim 85, wherein the aerogel is relatively insensitive to temperature variations and provides a high degree of structural support and pressure sensitivity.

87. The method according to claim 86, wherein the aerogel comprises $SiO_2$.

88. The method according to claim 70, further comprising providing at least one of the first at least partially reflective surface layer and the second at least partially reflective surface layer comprising a semiconducting mirror.

* * * * *